(12) United States Patent
Morrison

(10) Patent No.: US 10,422,190 B2
(45) Date of Patent: Sep. 24, 2019

(54) QUICK CONNECT CONNECTION

(71) Applicant: Weatherford Technology Holdings, LLC, Houston, TX (US)

(72) Inventor: Jeffery Morrison, Missouri City, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 673 days.

(21) Appl. No.: 15/008,688

(22) Filed: Jan. 28, 2016

(65) Prior Publication Data
US 2017/0219141 A1 Aug. 3, 2017

(51) Int. Cl.
*E21B 17/046* (2006.01)
*F16L 37/086* (2006.01)
*F16L 21/08* (2006.01)
*E21B 17/04* (2006.01)

(52) U.S. Cl.
CPC ............ *E21B 17/046* (2013.01); *E21B 17/04* (2013.01); *F16L 21/08* (2013.01); *F16L 37/086* (2013.01); *Y10T 29/49826* (2015.01)

(58) Field of Classification Search
CPC ........ E21B 17/00; E21B 17/04; E21B 17/046; F16L 21/08; F16L 37/0842; F16L 37/086; F16L 37/088; F16L 37/0982; Y10T 29/49826
USPC .......... 285/91, 317, 321, 330, 376, 401, 404
See application file for complete search history.

(56) References Cited

U.S. PATENT DOCUMENTS

| 3,345,087 | A | * | 10/1967 | Hanes | E21B 17/046 285/321 X |
| 4,138,148 | A | * | 2/1979 | Zaremba | 285/317 |
| 4,830,408 | A | * | 5/1989 | Reimert | E21B 17/046 285/321 X |
| 5,026,200 | A | * | 6/1991 | van Bilderbeek | E21B 17/046 285/321 X |
| 5,441,310 | A | | 8/1995 | Barrett et al. | |
| 8,474,879 | B2 | * | 7/2013 | Herrera | F16L 37/088 285/321 |
| 8,505,984 | B2 | | 8/2013 | Henderson et al. | |
| 9,222,607 | B2 | * | 12/2015 | Williams | F16L 15/009 |
| 2015/0000891 | A1 | | 1/2015 | Mowbray et al. | |

OTHER PUBLICATIONS

FASTORQ; The Speed of Innovation; Zip Technology; ZipNut and ZipCONNECTOR dated 2013; 7 total pages.

* cited by examiner

*Primary Examiner* — Greg Binda
*Assistant Examiner* — Zachary T Dragicevich
(74) *Attorney, Agent, or Firm* — Patterson + Sheridan, LLP

(57) ABSTRACT

A tubular connection assembly that maybe quickly connected and with improved capacity for axial loads is disclosed. The tubular connection assembly may include a box end member having a first groove formed in an inner surface, a pin end member having a second groove formed in an outer surface, and a load transfer assembly comprising two or more segments. When the pin end member is inserted in the box end member and the first groove aligns with the second groove, the load transfer assembly is at least partially disposed in both the first groove and the second groove.

19 Claims, 10 Drawing Sheets

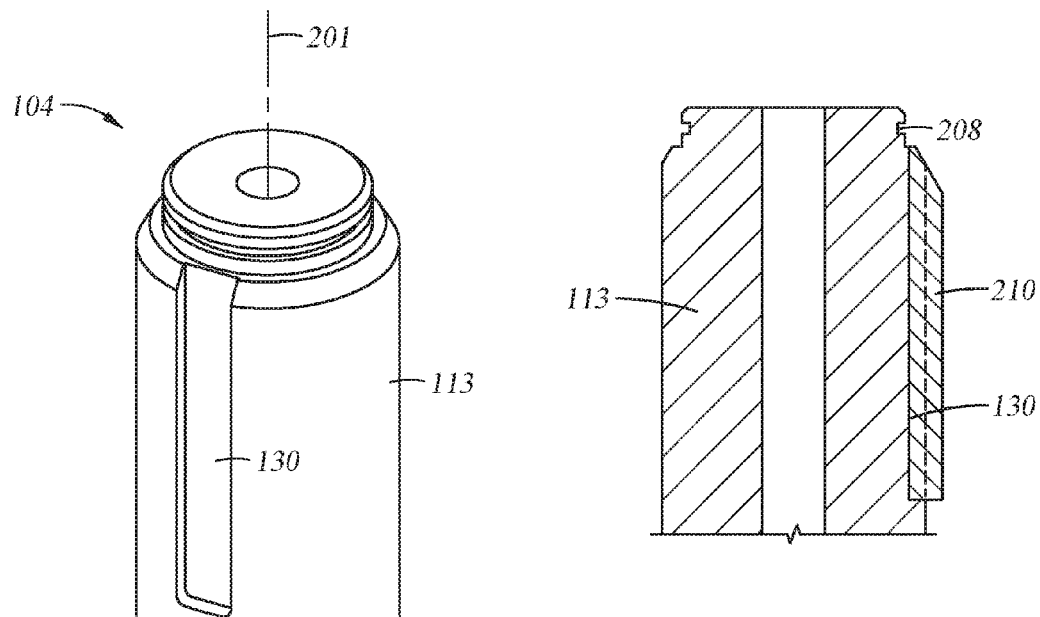
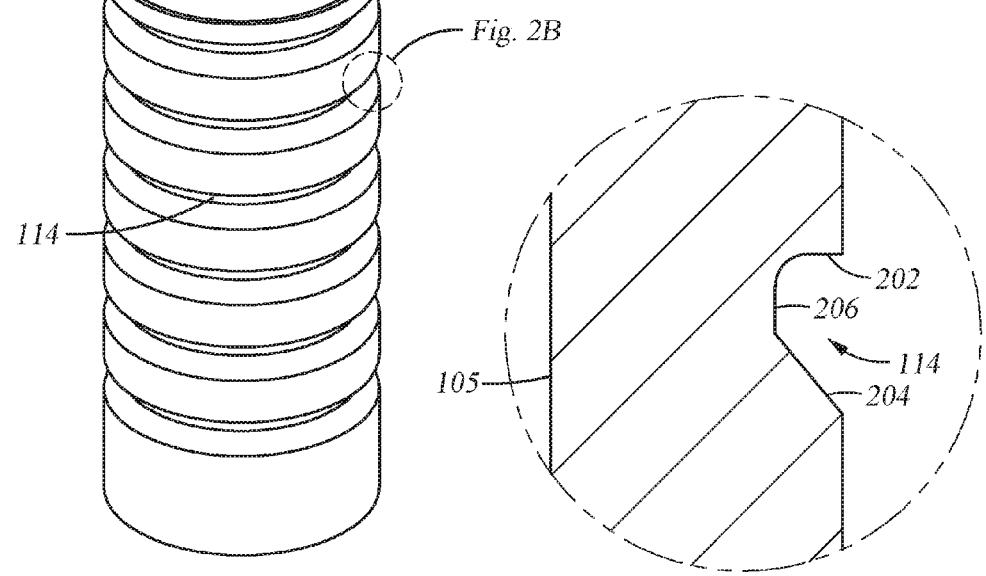
Fig. 2A    Fig. 2B
Fig. 2C

QUICK CONNECT CONNECTION

BACKGROUND

Field

Embodiments of the present disclosure relates to apparatus and methods for making quick connection and disconnections between tubulars used in well operations. More particularly, embodiments of the present disclosure relate to a connection assembly that supports axial tensile loading, transmits torque and/or provides a pressure seal for fluid.

Description of the Related Art

During well operations, such as drilling, completion and production, tools are frequently connected and disconnected. For example, a cement head may be connected and disconnected from a casing during cementing process. The connections between a cement head and a casing supports axial loading and torque loading, and also provides a pressure seal. Traditionally, a breech lock connection is used to quickly connect and disconnect a cement head. However, a breech lock only uses half of the material available at the connection to support axial loading. To increase support for axial loading, a breech lock needs to increase its diameter. However, the tools to be connected may have limited space for the connection. As a result, traditional breech lock type connections cannot satisfy the need for increased axial loading.

Therefore, there is a need for apparatus and methods for quick connection with improved support for axial loading.

SUMMARY

Embodiments of the present disclosure relate to a tubular connection assembly that maybe quickly connected and with improved capacity for axial loads.

One embodiment of the present disclosure provides a tubular connection assembly. The tubular connection assembly may include a box end member having a first groove formed in an inner surface, a pin end member having a second groove formed in an outer surface, a load transfer assembly comprising two or more segments, wherein when the pin end member is inserted in the box end member and the first groove aligns with the second groove, the load transfer assembly is at least partially disposed in both the first groove and the second groove, and a release member selectively inserted between the box end member and the pin end member to disconnect the box end member and the pin end member.

Another embodiment of the present disclosure provides a tubular connection assembly including a box end member having a tubular body with a central bore, wherein an inner surface of the tubular body includes two or more first grooves, and two or more load transfer assemblies. Each load transfer assembly is disposed in a corresponding first groove. Each load transfer assembly may include two or more segments, and a bias member disposed around the two or more segments. The tubular connection assembly may further includes a pin end member having a tubular body with a central bore, wherein an outer surface of the tubular body includes two or more second grooves corresponding to the two or more first grooves, and at least a portion of each segment is disposed in the corresponding second groove.

Another embodiment provides a method for connecting to two tubular members. The method may include connecting a pin end member and a box end member by inserting the pin end member into the box end member until a load assembly is at least partially disposed in both a first groove formed in an inner surface of the box end member and a second groove formed in an outer surface of the pin end member, and inserting a release member between the pin end member and the box end member to disconnect the pin end member and the box end member.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2A is a schematic side view of a pin end connection member according to one embodiment of the present disclosure.

FIG. 2B is a partial sectional view of the pin end connection member of FIG. 2A showing a load profile.

FIG. 2C is a partial sectional view of the pin end connection member of FIG. 2A showing a seal profile and a torsional profile.

Figure 1A:
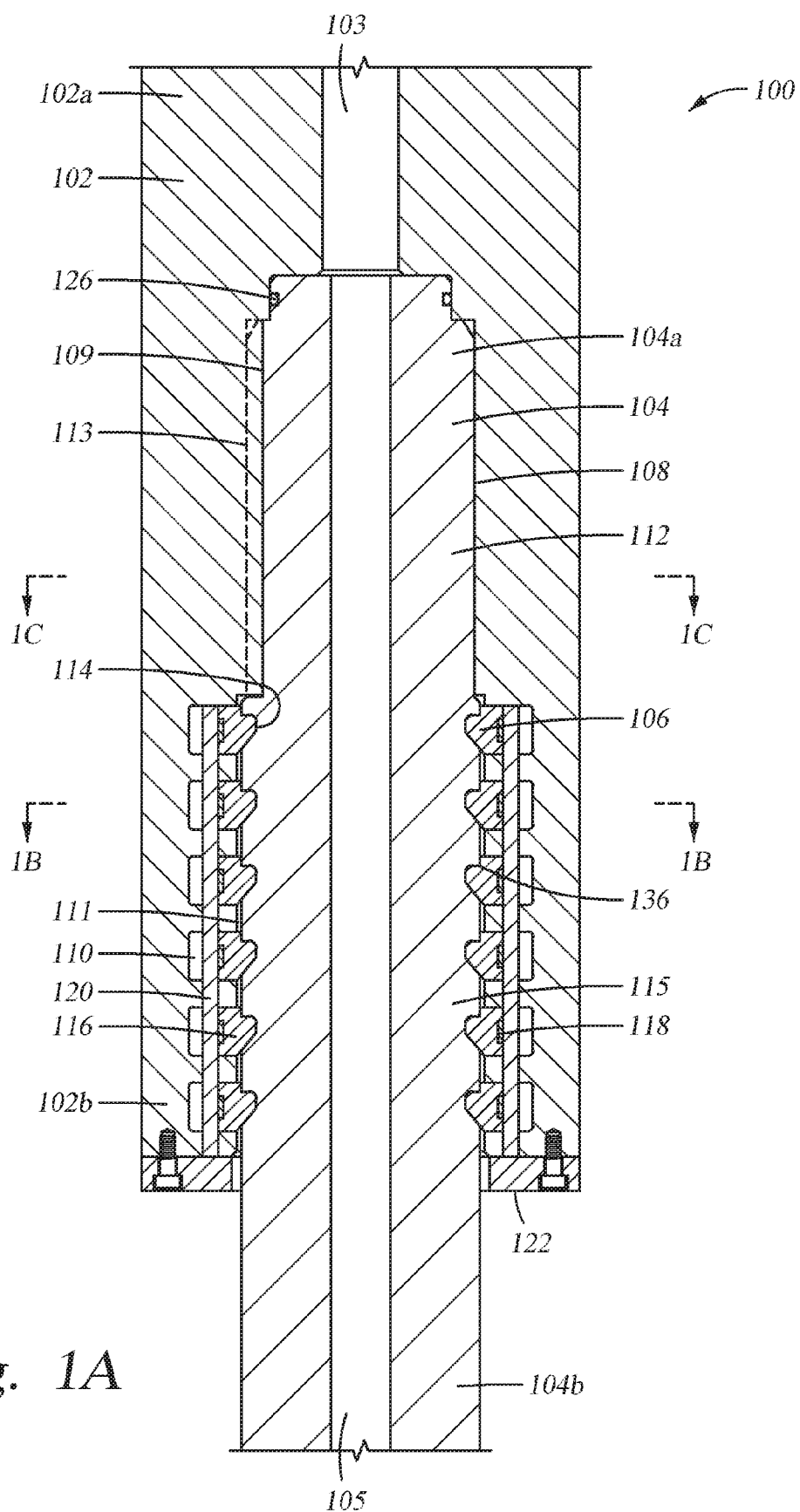
FIG. 1A is a schematic sectional side view of a tubular connection assembly according to one embodiment of the present disclosure. The tubular connection is in a connected position.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

The descriptions of the various embodiments are presented for illustrative purposes and are not intended to be exhaustive or limiting. Many modifications and variations will be apparent to those of ordinary skill in the art without departing from the scope and spirit of the described embodiments. The terminology used herein was chosen to best explain the principles of the embodiments, the practical applications or technical improvements over technologies found in the marketplace, or to enable others of ordinary skill in the art to understand the embodiments disclosed herein.

Embodiment of the present disclosure relate to a tubular connection assembly that may be quickly connected and disconnected. In one embodiment, the tubular connection assembly includes a box end member and a pin end member. The box end member and the pin end member may be joined together by a load transfer assembly. In one embodiment, the load transfer assembly may be a split ring assembly having two or more ring segments. In one embodiment, the two or more ring segments may form a complete circle. Alternatively, the two or more ring segments may form a partial ring circle. Alternatively, the load transfer member may include a ring having an opening.

FIG. 1A is a schematic sectional side view of a tubular connection assembly 100 according to one embodiment of the present disclosure. The tubular connection assembly 100 may include a box end member 102, a pin end member 104, and a split ring assembly 106 configured to selectively connect the box end member 102 and the pin end member 104. The box end member 102 may be connected to a top drive on an oil rig and the pin end member 104 may be connected to a tool. In one embodiment, the pin end member 104 may be connected to a cementing tool. However, the tubular connecting assembly 100 may be used to connect any two tubular components.

In FIG. 1A, the tubular connection assembly 100 is in a connected position so that at least axial loads can be transferred between the box end member 102 and the pin end member 104. In one embodiment, when connected, the tubular connection assembly 100 is capable of transferring both axial loads and torsional loads.

The box end member 102 may be a tubular member having an upper end 102a, a lower end 102b, and a central bore 103 extending between the upper end 102a and the lower end 102b. A connection box 108 may be formed at the lower end 102b of the box end member 102. The connection box 108 may be a substantially cylindrical recess for receiving the pin end member 104. The connection box 108 may include a torsion transfer portion 109 and an axial load transfer portion 111. The torsion transfer portion 109 may have a key or keyway for torsion transferring. The axial load transfer portion 111 may have one or more grooves 110 formed therein to house the split ring assembly 106 therein.

The pin end member 104 may be a tubular member having an upper end 104a, a lower end 104b, and a central bore 105 extending between the upper end 104a and the lower end 104b. The upper end 104a may include a connection pin 112 configured to couple with the connection box 108 in the box end member 102. The connection pin 112 may include a torsion transfer portion 113 having a keyway or a key formed therein to prevent the pin end member 104 from rotating relative to the box end member 102.

In one embodiment, a seal member 126 may be disposed between the box end member 102 and the pin end member 104 to isolate the fluid flow through the central bore 103 and the central bore 105. The seal member 126 may be an O-ring seal. Even though one seal member 126 is shown in FIG. 1A, two or more seal members 126 may be form a seal.

The connection pin 112 may include an axial load transfer portion 115 have one or more grooves 114 formed on an outer surface. The one or more grooves 114 are configured to receive the split ring assembly 106 when the pin end member 104 is connected to the box end member 102. Each of the one or more grooves 114 are configured to align with a corresponding one of the one or more grooves 112 in the box end member 102 to hold a split ring assembly 106 therebetween.

The split ring assembly 106 may include one or more set of ring segments 116. Each set of ring segments 116 may include two or more segments 116 that form a circular ring. In one embodiment, the ring segments 116 may be of identical in size. A spring member 118 may be disposed at an outer diameter of each set of ring segments 116 to bias the ring segments 116 towards each other. Each set of ring segments 116 and the corresponding spring member 118 may be movably disposed in one of the grooves 110 in the box end member 102. Each ring segment 116 may have an inner profile similar to a profile of a ratchet tooth. When the pin end member 104 is not connected to the box end member 102, the split ring assembly 106 is disposed in the groove 110 and biased by the spring member 118 to form a closed ring. During the process of connecting the pin end member 104 and the box end member 102, the pin end member 104 pushes the ring segments 116 apart to enter the box end member 102. Once the groove 110 and 114 align with each other, the ring segments 116 are pushed radially inward by the spring member 118 into occupy the groove 114. The ratchet teeth profile of ring segments 116 allows the pin end member 104 to move into the box end member 102 but prevents the pin end member 104 for exiting out of the box end member 102, thus forming a connection capable of transferring axial load.

During connection, the spring member 118 pushes the ring segments 116 into the groove 114 of the pin end member 104 to form a joint. In one embodiment, the split ring assembly 106 may further include one or more locking pins 120 configured to insert into the box end member 102 to prevent the ring segments 116 from popping out of the grooves 114 thus locking the tubular connection assembly 100 in the connected position. The locking pins 120 may be inserted radially outside the spring member 118 after the pin end member 104 is connected to the box end member 102. In one embodiment, the number of the locking pins 120 is equal to the number of ring segments 116 in each set of ring segments 116 so that there is a locking pin 120 radially outward of each ring segment 116. After the locking pins 120 are inserted into the box end member 102, a stopper 122 may be attached to the box end member 102 to prevent the locking pins 120 from falling off. In one embodiment, the stopper 122 may be a unitary or a split nut. In one embodiment, the stopper 122 may be attached to the box end member 102 by traditional methods, such as by screws.

Figure 1B:
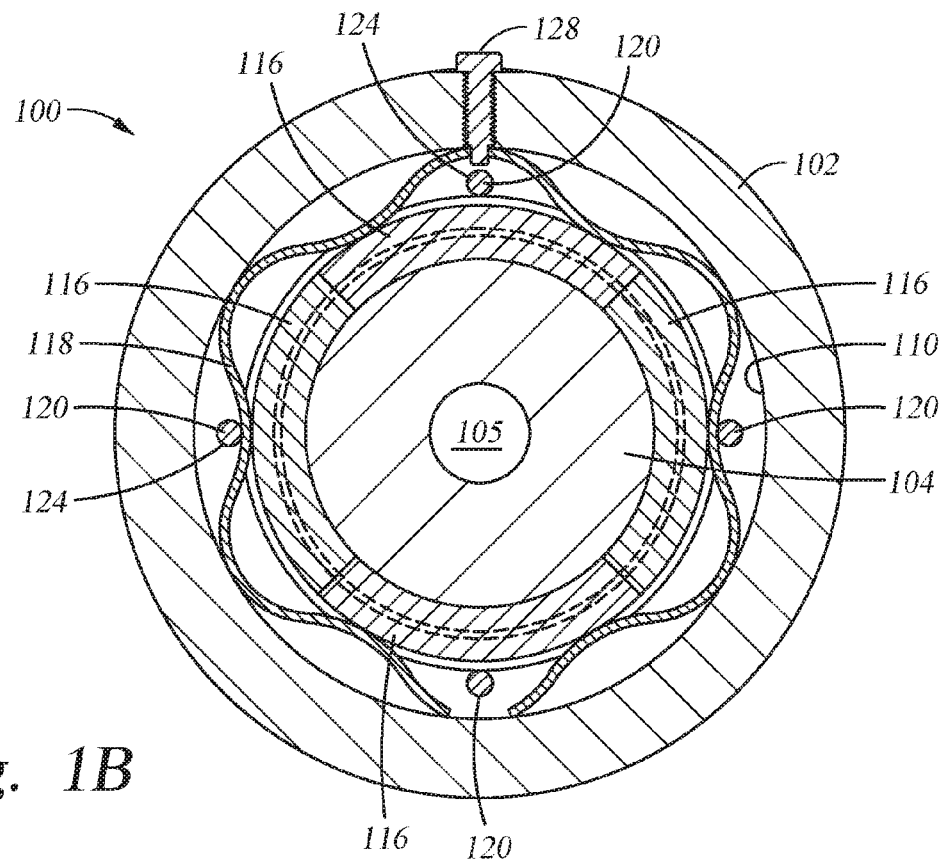
FIGS. 1B and IC are schematic sectional views of the tubular connection assembly of FIG. 1A.

FIG. 1B is a schematic sectional view of the tubular connection assembly 100 across one of the split ring assemblies 106. In FIG. 1B, each split ring assembly 106 includes four ring segments 116. Alternatively, each split ring assembly 106 may include any number of ring segments 116 according to needs or geometry limitations. With an operating inner diameter (the inner diameter of a split ring when the ring segments form a closed ring) remains the same, a split ring assembly with a higher number of ring segments can expand to a larger inner diameter than a split assembly with a lower number of ring segments when the ring segments move radially outward at the same distance. The number of ring segments may be increased to allow a pin end member of a larger outer diameter to pass through without increasing the inner diameter of the box end member.

In FIG. 1B, the spring member 118 is a wave ring. Alternatively, the spring member 118 may be any types of spring. In one embodiment, an anchoring element 128 may be used to secure each spring ember 118 to the box end member 102. In one embodiment, the anchoring element 128 may be a screw. Grooves 124 may be formed along the axially direction in the box end member 102 to receive the locking pins 120.

Figure 1C:
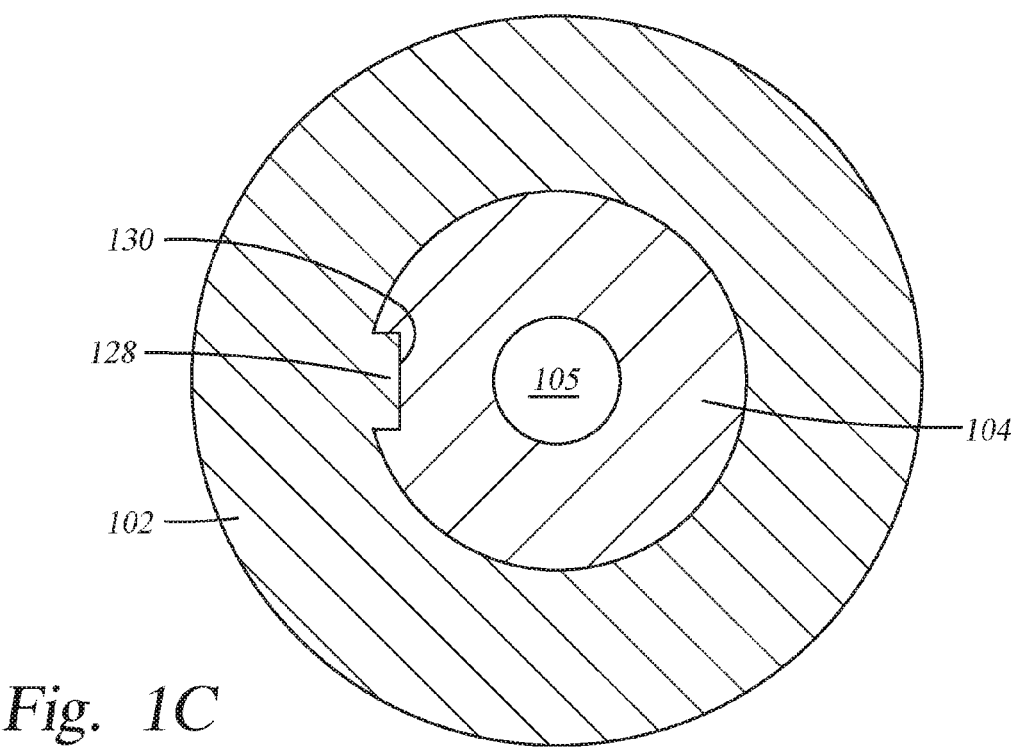
FIG. 1D is a schematic sectional side view of the tubular connection assembly of FIG. 1A being connected.
FIG. 1E is a schematic sectional view of the tubular connection assembly of FIG. 1D.
FIG. 1F is a schematic sectional view of a release sleeve.
FIG. 1G is a partial sectional view of the tubular connection assembly of FIG. 1A being disconnected using a release sleeve.
Figure 1D:
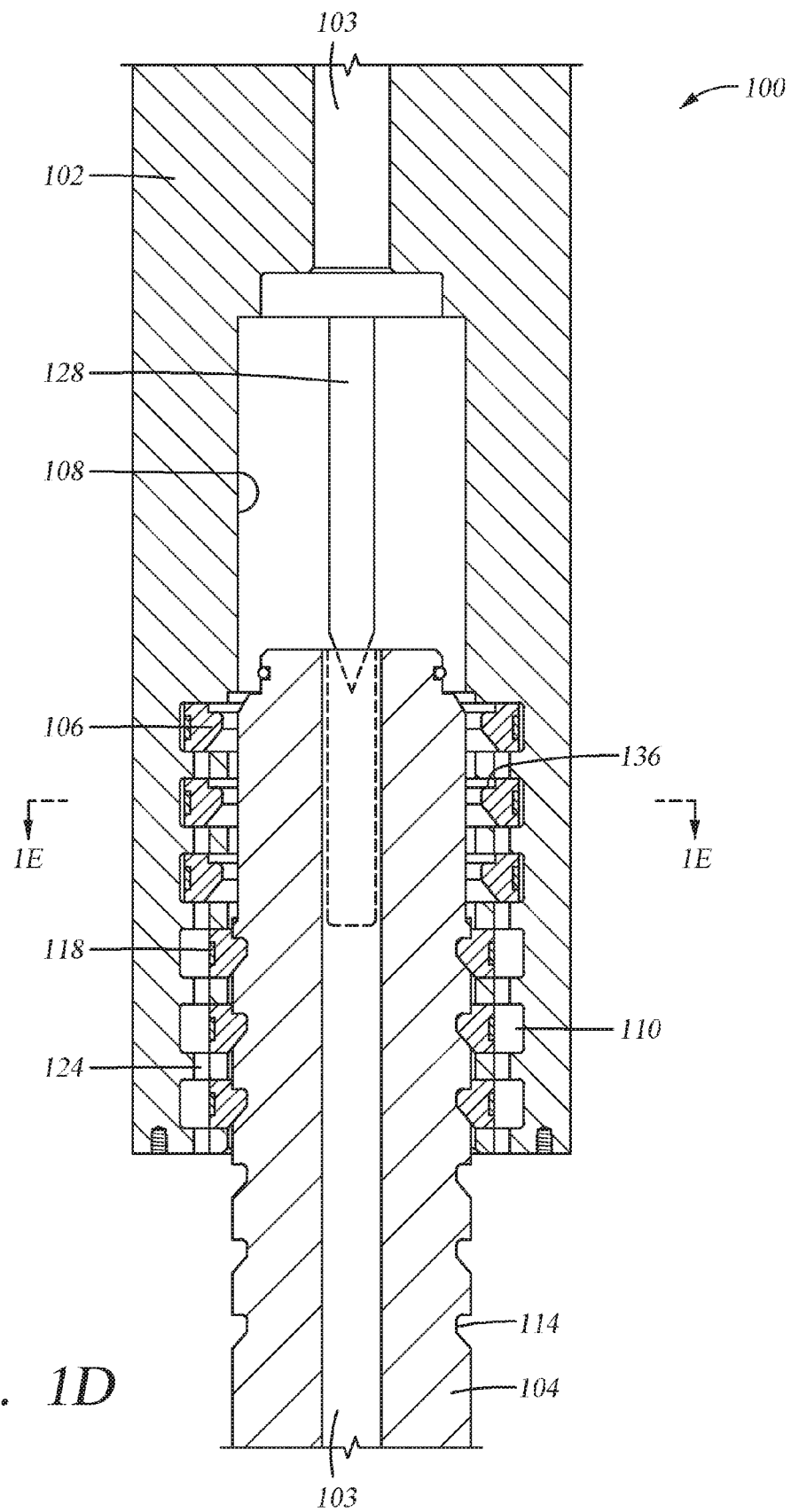

FIG. 1C is a schematic sectional view of the tubular connection assembly 100 of FIG. 1A across the torsion transfer portion 113. In FIG. 1D, a key 128 is formed on an inner surface of the box end member 102. A keyway 130 is formed on an outer surface of the pin end member 104. When connected, the key 128 is inserted in to the keyway 130 allowing torsional load to transfer between the box end member 102 and the pin end member 104. In the embodiment of FIG. 1C, the key 128 is an integral part of the box end member 102. For example, the box end member 102 may be machined to have the key 128. Alternatively, the key 128 may be a separate component that later attached to the box end member 102, for example, by welding, soldering, or by crews. Alternatively, the box end member 102 may have a keyway formed on an inner surface while the pin end member 104 may have a key formed on an outer surface.

Figure 1E:
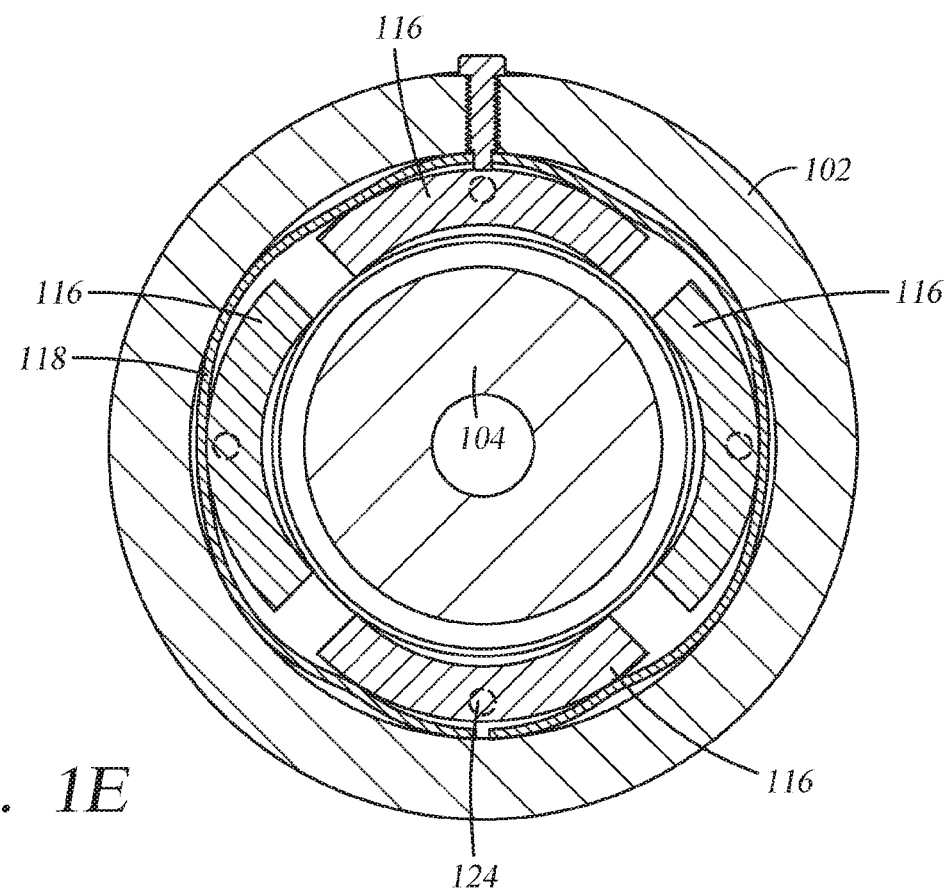

FIG. 1D is a schematic sectional side view of the tubular connection assembly 100 in a transitional position. FIG. 1E is a schematic cross sectional view of the tubular connection assembly 100 in the transitional position. Prior to connection, the one or more split ring assemblies 106 are disposed in the grooves 110 of the box end member 102. The bias member 118 pushes each set of ring segment 116 towards each other to form a closed ring. To connect the box end member 102 and the pin end member 104, insert the connect pin 112 of the pin end member 104 to the connection box 108 of the box end member 102. The connection pin 112 pushes the split ring assembly 106 apart to enter the connection box 108. FIG. 1E is a schematic sectional view of the tubular connection assembly 100 across a split ring assembly 106 while the ring segments 116 being pushed apart so that the pin end member 104 can pass through.

At the connected position, as shown in FIG. 1A, each of the grooves 110 of the box end member 102 is aligned with a corresponding groove 114 of the pin end member 104 with the split ring assembly 106 partially disposed in the groove 114 and partially disposed in the groove 110 while the key 128 enters the keyway 130. The locking pin 120 may be inserted into the locking groove 124 to lock the split ring assembly 106 in position. The ring segments 116 contacts an upper surface of the groove 114 forming a load carrying surface 136. Because the ring segments 116 form complete circle, the load carrying surface 136 is also a complete circle. Therefore, the complete circumference of the pin end member 104 may be used to carry tensile load.

Figure 1F:
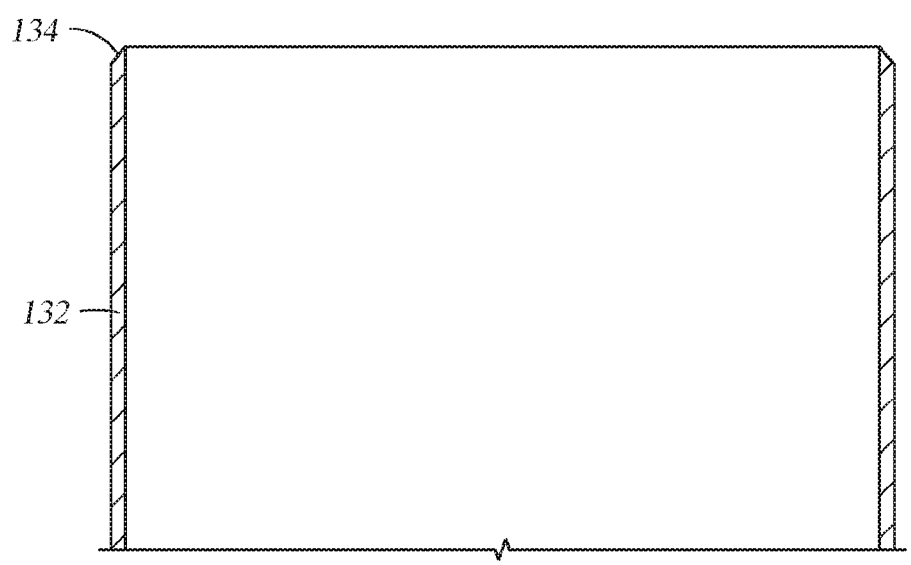
Figure 1G:
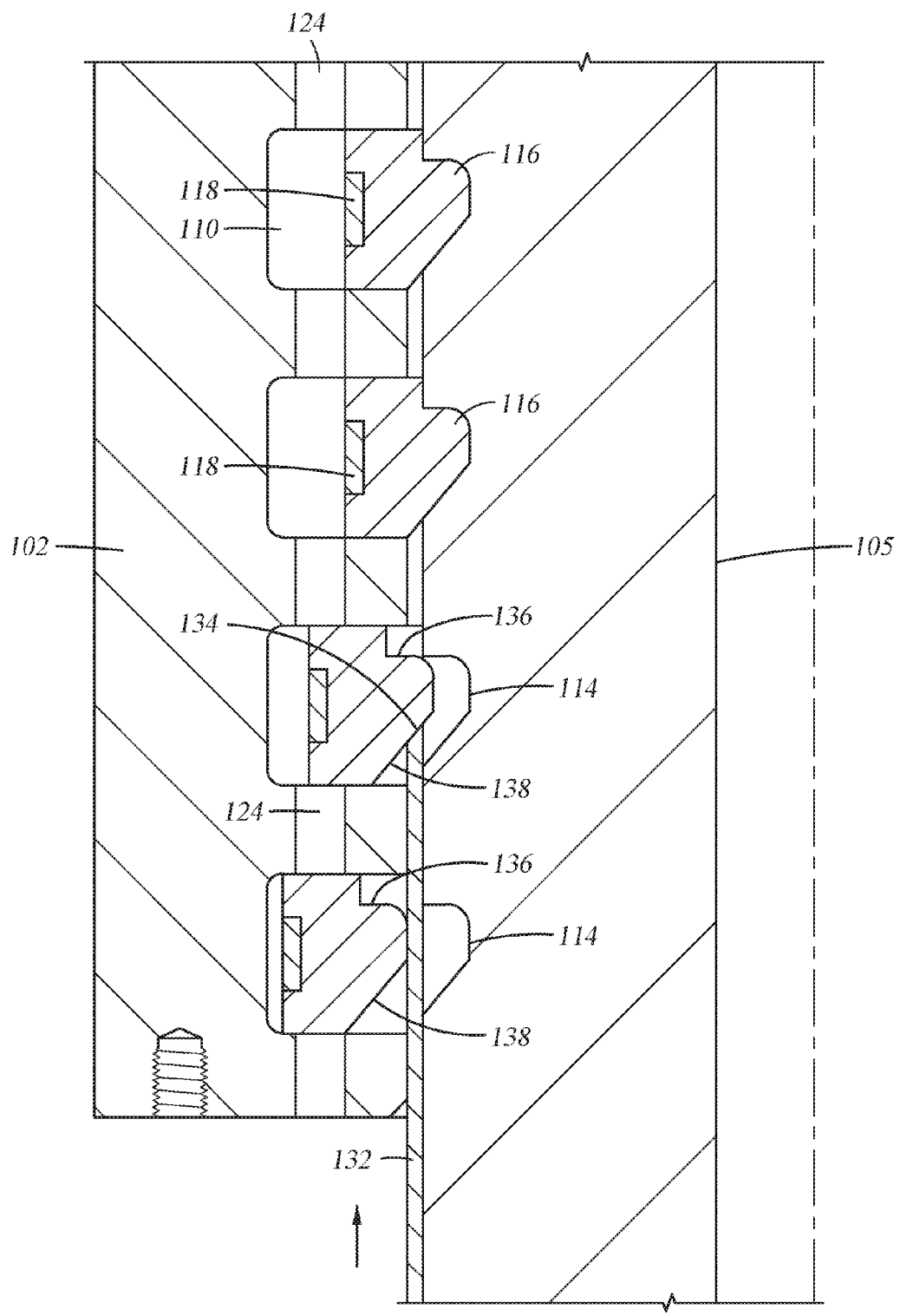

To disconnect the box end member 102 and the pin end member 104 from the connected position shown in FIG. 1A, the locking pins 120 may be first removed. A release member may be used to disconnect the tubular connection assembly 100. In one embodiment, the release member may be a release sleeve. Alternatively, the release member may be any suitable structure suitable to remove the split ring assembly 106 from the pen end member 104. FIG. 1F is a schematic sectional view of a release sleeve 132. FIG. 1G is a partial sectional view of the tubular connection assembly 100 being disconnected by the release sleeve 132. The release sleeve 132 may have a beveled upper end 134. The beveled upper end 134 may act on the slope of a lower profile 138 of the ring segments 116 so that a push of release sleeve 132 may cause the ring segments 116 to move radially outwards and out of the groove 114 of the pin end member 104. The release sleeve 132 may be a one piece sleeve or split sleeve having two or more pieces for ease of operation.

FIG. 2A is a schematic side view of the pin end member 104 according to one embodiment of the present disclosure. The pin end member 104 may be any tubular, such as drill pipes, casing pipes, or tools for tubular strings. In one embodiment, the pin end member 104 may be a tubular component in a cement head assembly. FIG. 2B is partial sectional views of the pin end member 104 showing a profile of the groove 114. The groove 114 may include an upper wall 202, a lower wall 204, and a bottom 206 connecting between the upper wall 202 and the lower wall 204. The upper wall 202 may be substantially perpendicular to an axial axis 201. When connected, the upper wall 202 connects the ring segments 116 to carry axial loads. The lower wall 204 may be a sloped to match a sloped profile of the ring segments 116.

FIG. 2C is a partial sectional view of the pin end member 104 showing the torsion transfer portion 113. In one embodiment, one or more groove 208 may be formed at an upper end of the pin end member 104. Each groove 208 may be configured to receive a seal member, such as an O-ring seal, or an S-seal. In one embodiment, a machined key 210 may be disposed in the keyway 130. The machined key 210 may be attached to pin end member 104, for example by screws. Alternatively, the key 210 may be directly formed on the pin end member 104. In one embodiment, the keyway 130 on the pin end member 104 does not have an attached key. Instead the keyway 130 is configured to couple with a key on the box end member 102.

Figure 3:
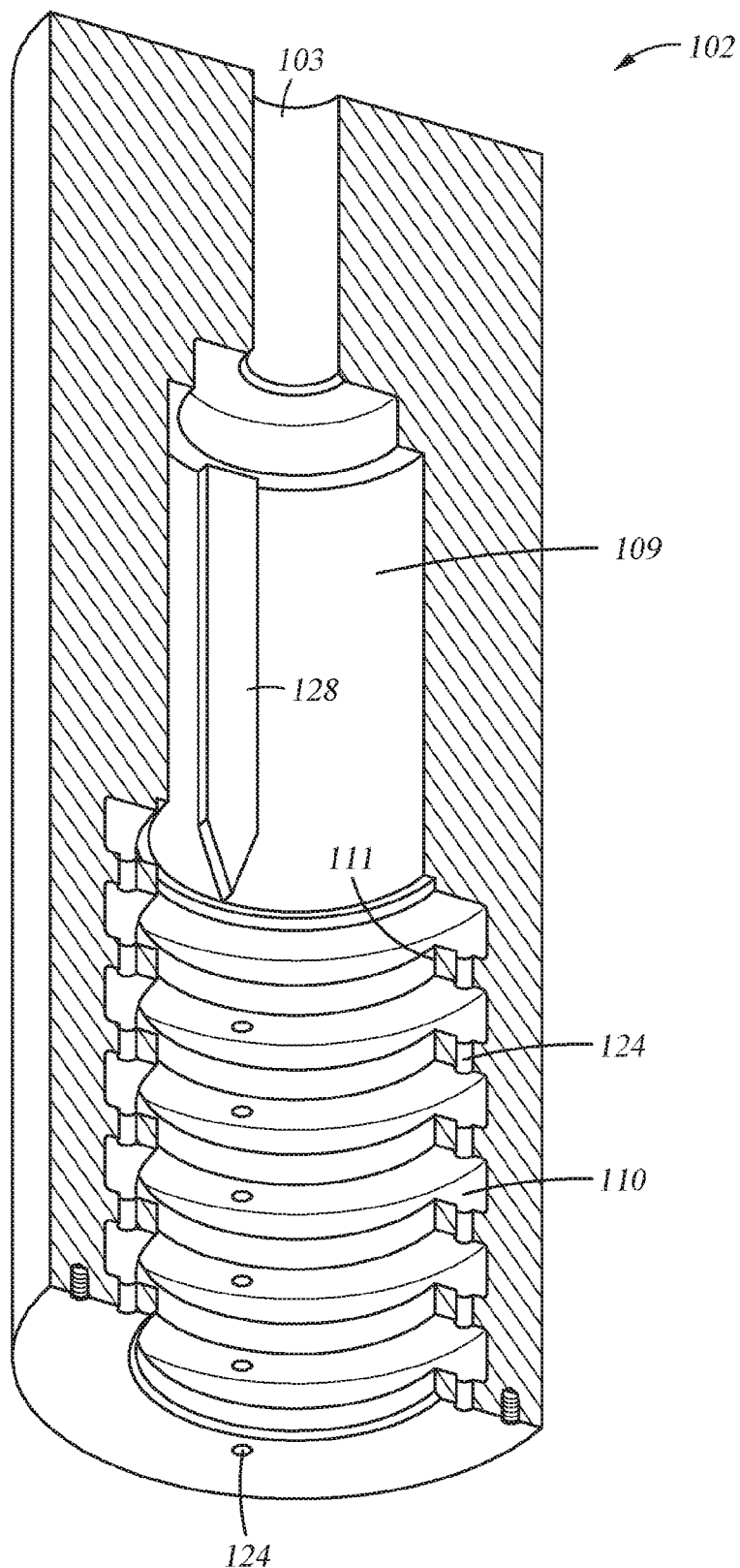
FIG. 3 is a schematic sectional view of a box end connection member according to one embodiment of the present disclosure.

FIG. 3 is a schematic sectional view of the box end member 102 with the split ring assemblies 106 removed from the grooves 110 to show the one or more grooves 124 for housing locking pins 120 are formed axially across the grooves 110. The split ring assemblies 106 are pre-installed in the grooves 110. After the pin end member 104 is inserted into the box end member 102 with the grooves 114 engaged to with the split ring assemblies 106, the locking pins 120 can be inserted into the grooves 124 to lock the split ring assemblies 106 to the pin end member 102.

Figure 4A:
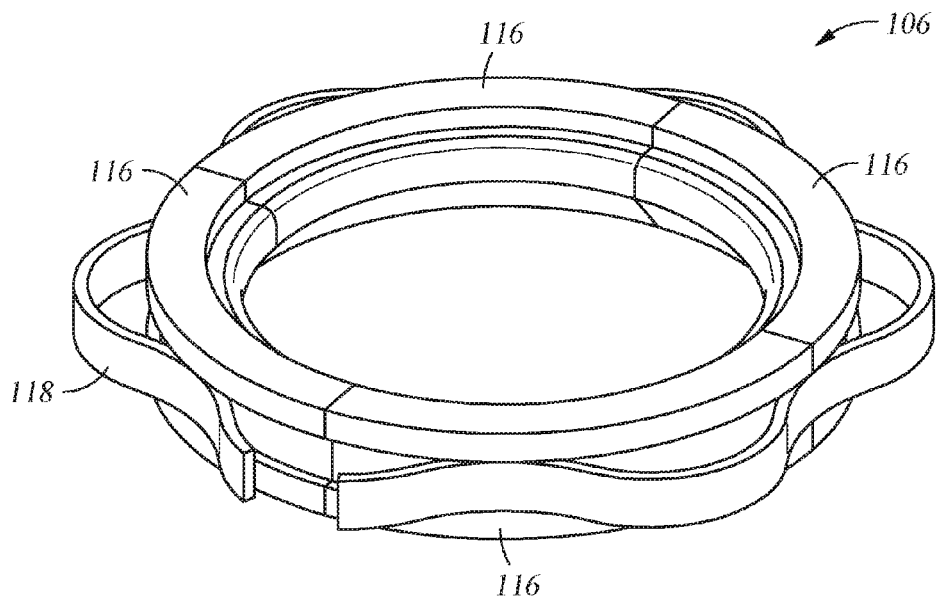
FIG. 4A is a schematic perspective view of a split ring assembly according to one embodiment of the present disclosure.

FIG. 4A is a schematic perspective view of the split ring assembly 106 according to one embodiment of the present disclosure. The split ring assembly 106 includes two or more ring segments 116 held together by the bias member 118. The bias member 118 pushes the ring segments 116 together to form a ring. The ring segments 116 may be pushed apart to expand the inner diameter of the split ring assembly 106. In FIG. 4A, the bias member 118 is a wave spring. The wave spring 118 takes small space and can lock all ring segments 116 in the same level into to the groove 114. Alternatively, the bias member may be a normal coil spring, or other springs. In one embodiment, the bias member 118 may be positioned so that the bias member 118 contacts each of the ring segments 116.

Figure 4B:
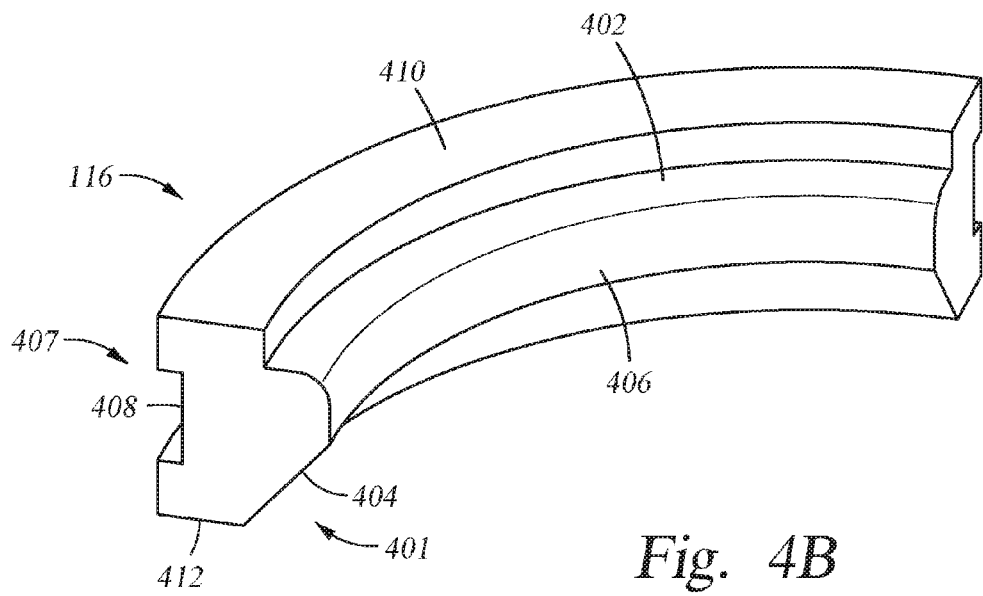
FIG. 4B is a schematic perspective view of a ring segment of the split ring assembly of FIG. 4A.

FIG. 4B is a schematic perspective view of the ring segment 116 of the split ring assembly of FIG. 4A. The ring segment 116 is a portion of a ring having substantially planar upper surface 410 and lower surface 412. The upper surface 410 and lower surface 412 allow the ring segment 116 to slide radially in the groove 110 of the box end member 102.

The ring segment 116 has an inner profile 401 and an outer profile 407 connecting the upper surface 410 and lower surface 412.

The inner surface 410 is configured to engage with grooves 114 of the pin end member 104. The inner profile 401 may include a load carrying shoulder 402, a sloped section 404, and a vertical section 406 connecting the load carrying shoulder 402 and the sloped section 404. The load carrying shoulder 402 matches the upper wall 202 of the groove 114 in the pin end member 104. The slope section 404 matches the lower wall 204 of the groove 114 in the pin end member 104.

In one embodiment, the outer profile 407 may include a groove 408 configured to retain the bias member 118. The groove 408 prevents the bias member 118 from moving axially relative to the ring segment 116 and the bias member 118 keeps the two or more ring segments 116 in the same plane.

Figure 5:
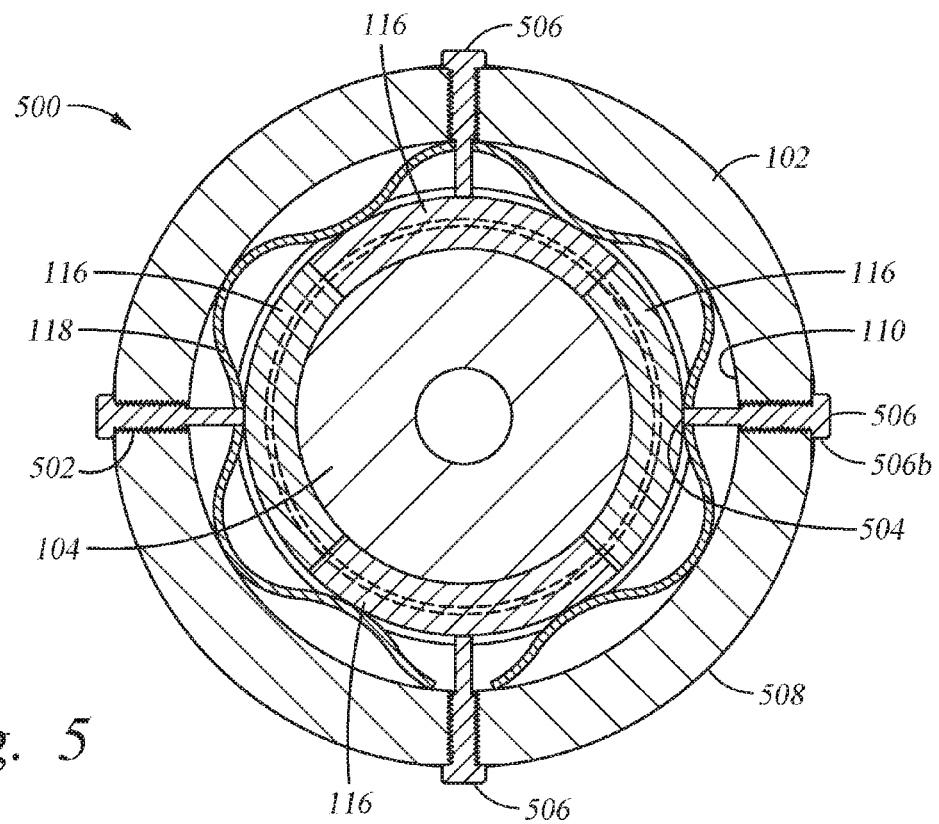
FIG. 5 is a schematic sectional view of a tubular connection assembly according to another embodiment of the present disclosure.

FIG. 5 is a schematic sectional view of a tubular connection assembly 500 according to another embodiment of the present disclosure. The tubular connection assembly 500 is similar to the tubular connection assembly 100 of FIGS. 1A-1G except that the tubular connection assembly 500 has a different locking mechanism. The tubular connection assembly 500 may include two or more locking screws 506. When the pin end member 104 and the box end member 102 are coupled together, each locking screw 506 may be used to lock a ring segment 116 towards the pin end member 102. In one embodiment, each screw 506 may be disposed through a hole 502 in the box end member 104 with a nut end 506a outside the box end member 104 and a threaded end 504 engaging a ring segment 116. The screw 506 may be threaded deeper into the ring segment 116 so the nut end 506a is against an outer surface 508 of the box end member 104 to lock the ring segment 116 to the pin end member 104. The screw 506 may be threaded backwards to unlock the pin end member 102.

Figure 6:
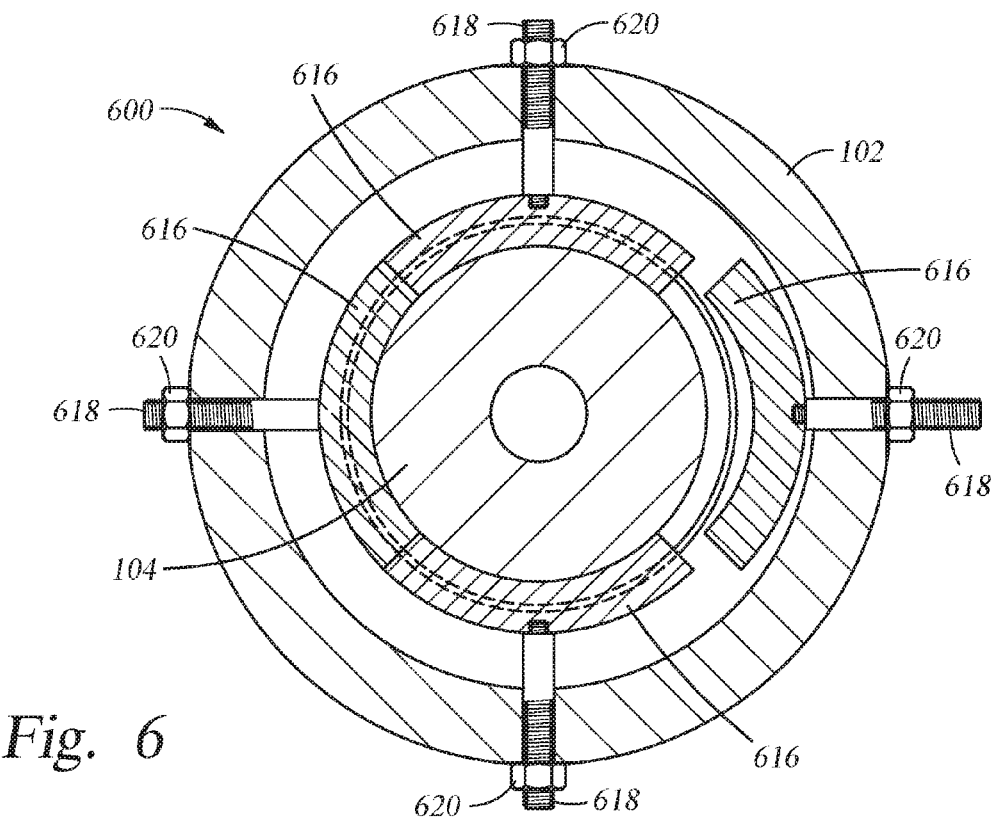
FIG. 6 is a schematic section view of a tubular connection assembly according to another embodiment of the present disclosure.

FIG. 6 is a schematic section view of a tubular connection assembly 600 according to another embodiment of the present disclosure. The tubular connection assembly 600 is similar to the tubular connection assembly 100 except that the tubular assembly 600 does not include the bias member 118. The tubular connection assembly 600 includes two or more ring segments 616 to form a split ring assembly. A bolt 618 may be extending from each ring segment 616. When assembled, the bolt 618 may be extend through a through hole 602 in the box end member 102. A nut 620 may be movably attached to a threaded portion of the bolt 618. By moving the nut 620 along the bolt 618 may move the ring segment 616 relative to the pin end member 104.

Figure 7:
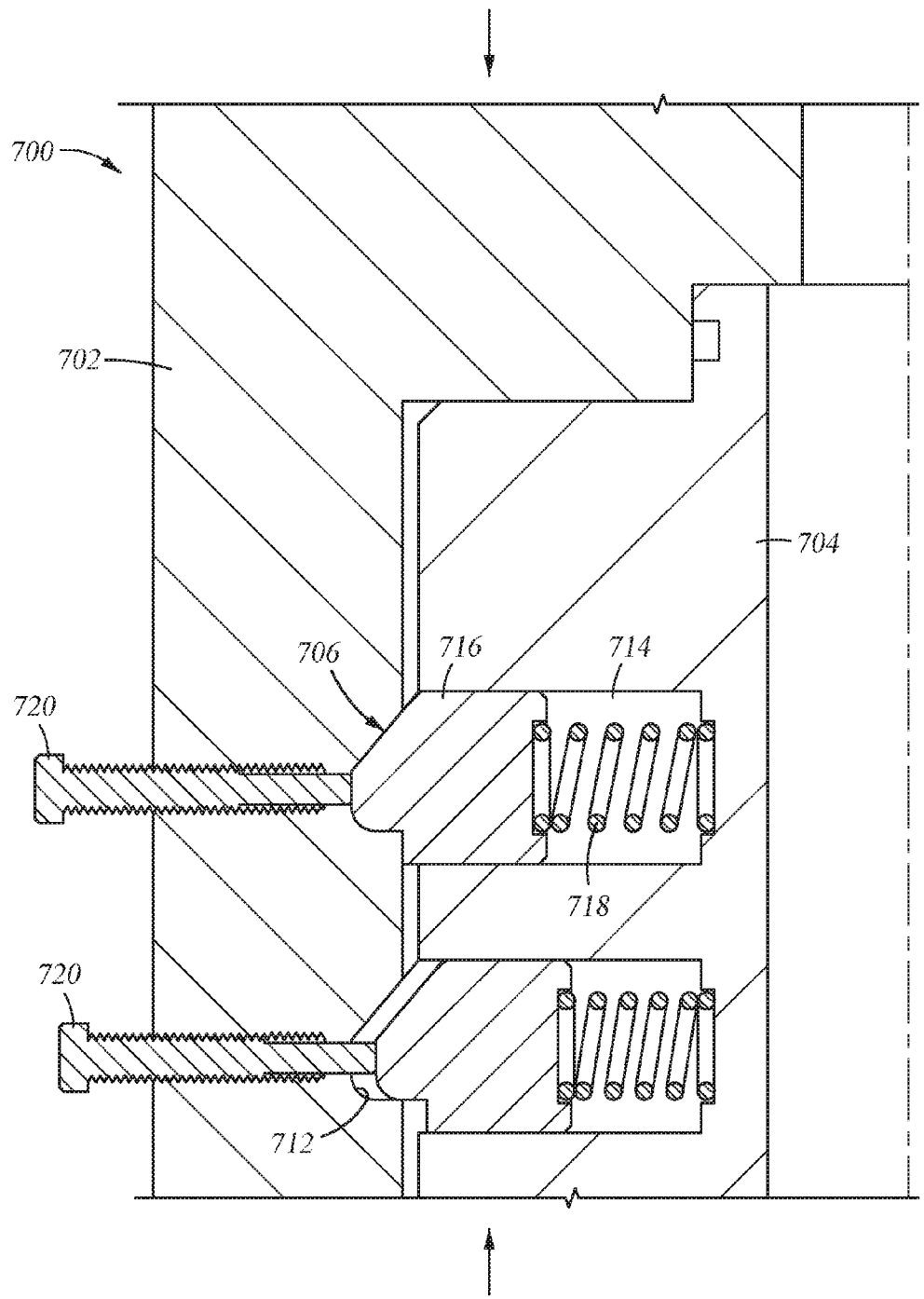
FIG. 7 is a schematic sectional view of a tubular connection assembly according to another embodiment of the present disclosure.

FIG. 7 is a schematic sectional view of a tubular connection assembly 700 according to another embodiment of the present disclosure. The tubular connection assembly 700 includes a box end member 702, a pin end member 704, and one or more split ring assembly 706 configured to selectively couple the box end member 702 and the pin end member 704. The split ring assembly 706 may be pre-installed in grooves 714 of the pin end member 704. In one embodiment, a bias member 718, such as a spring, may be bias the ring segment 716 radially outwards to engage the box end member 102. When the pin end member 704 is being inserted into the box end member 702, the bias member 718 is pressed to allow the ring segment 716 to retract back into the groove 714. Once the groove 714 aligns with the corresponding groove 712 in the box end member 712, the ring segment 716 extends into the groove 712 under the force of the bias member 718. To release the connection between the box end member 702 and the pin end member 702, a screw 720 may be threaded through the box end member 702 to push the ring segment 716 out of the groove 712.

One embodiment provides a tubular connection assembly including a box end member having a first groove formed in an inner surface, a pin end member having a second groove formed in an outer surface, and a split ring assembly comprising two or more ring segments. When the pin end member is inserted in the box end member and the first groove aligns with the second groove, the split ring assembly is disposed between the first groove and the second groove to transfer axial loads between the box end member and the pin end member.

One embodiment of the present disclosure provides a tubular connection assembly. The tubular connection assembly may include a box end member having a first groove formed in an inner surface, a pin end member having a second groove formed in an outer surface, a load transfer assembly comprising two or more segments, wherein when the pin end member is inserted in the box end member and the first groove aligns with the second groove, the load transfer assembly is at least partially disposed in both the first groove and the second groove, and a release member selectively inserted between the box end member and the pin end member to disconnect the box end member and the pin end member.

In one or more embodiment, the two or more segments are ring segments, the load transfer assembly further comprises a bias member disposed around the two or more ring segments to maintain relative positions of the two or more ring segments.

In one or more embodiment, the tubular connection assembly further comprises an anchoring member attaching the load transfer assembly to the box end member.

In one or more embodiment, the anchoring member couples the bias member to the box end member.

In one or more embodiment, the bias member is a wave ring.

In one or more embodiment, the tubular connection assembly further comprises two or more lock pins selectively inserted in the box end member to prevent the two or more segments from popping out of the second groove.

In one or more embodiment, the tubular connection assembly further includes a stopper attachable to the box end member to keep the two or more lock pins in position.

In one or more embodiment, the release member is a sleeve having a beveled upper end.

In one or more embodiment, the box end member and the pin end member are connected by a key and a key way for transferring torsional loads.

In one or more embodiment, the load transfer assembly further comprises a bolt attached to each of the two or more segments, wherein the bolt extends through a wall of the box end member, and a nut coupled to the bolt to adjust radial position of the segments.

In one or more embodiment, the load transfer assembly is movably disposed in the second groove.

In one or more embodiment, the tubular connection assembly further includes a bias element disposed in the second groove between the load transfer assembly and the pin end member.

Another embodiment provides a tubular connection assembly including a box end member having a tubular body with a central bore, wherein an inner surface of the tubular body includes one or more first grooves, and one or more split ring assembly movably disposed in the one or more first grooves of the box end member. Each split ring assembly includes two or more ring segments forming a circle, and a bias member disposed around the two or more ring segments. The tubular connection assembly further includes a pin end member having a tubular body with a central bore, wherein an outer surface of the tubular body includes one or more second grooves, wherein a portion of each ring segments is disposed in the second groove.

Another embodiment of the present disclosure provides a tubular connection assembly including a box end member having a tubular body with a central bore, wherein an inner surface of the tubular body includes two or more first grooves, and two or more load transfer assemblies. Each load transfer assembly is disposed in a corresponding first groove. Each load transfer assembly may include two or more segments, and a bias member disposed around the two or more segments. The tubular connection assembly may further includes a pin end member having a tubular body with a central bore, wherein an outer surface of the tubular body includes two or more second grooves corresponding to the two or more first grooves, and at least a portion of each segment is disposed in the corresponding second groove.

In one or more embodiment, the box end member is connected to a top drive, and a pin end member is connected to a tool.

In one or more embodiment, the tubular connection assembly may further include a release member selectively inserted between the box end member and the pin end member.

In one or more embodiment, the tubular connection assembly may further include two or more lock pins selectively inserted into the box end member, wherein each lock pin is positioned radially outside a corresponding segment.

Another embodiment provides a method for connecting to two tubular members. The method includes connecting a pin end member and a box end member by inserting the pin end member into the box end member until a split ring assembly is positioned between a first groove formed in an inner surface of the box end member and a second groove formed in an outer surface of the pin end member, and inserting a lock pin to the box end member to prevent the split ring assembly from popping out of the second groove.

Another embodiment provides a method for connecting to two tubular members. The method may include connecting a pin end member and a box end member by inserting the pin end member into the box end member until a load assembly is at least partially disposed in both a first groove formed in an inner surface of the box end member and a second groove formed in an outer surface of the pin end member, and inserting a release member between the pin end member and the box end member to disconnect the pin end member and the box end member.

In one or more embodiment, the method further includes aligning a torque key formed on the pin end member with a key way formed in the box end member, wherein connecting the pin end member and the box end member comprises inserting the key into the key way.

In one or more embodiment, the method further includes inserting a lock pin to the box end member to prevent the load transfer assembly from popping out of the second groove.

In one or more embodiment, the method further includes attaching a stopper to secure the lock pin.

While the foregoing is directed to embodiments of the present disclosure, other and further embodiments of the disclosure may be devised without departing from the basic scope thereof, and the scope of the present invention is determined by the claims that follow.

The invention claimed is:

1. A tubular connection assembly, comprising:
 a box end member having a first groove formed in an inner surface;
 a pin end member having a second groove formed in an outer surface;
 a load transfer assembly comprising two or more segments, wherein when the pin end member is inserted in the box end member and the first groove aligns with the second groove, the load transfer assembly is at least partially disposed in both the first groove and the second groove; and
 a release member selectively inserted between the box end member and the pin end member to disconnect the box end member and the pin end member, wherein the release member comprises a sleeve with a beveled upper end, and during release the beveled upper end of the sleeve pushes the segments of the load transfer assembly out of the second groove in the pin end.

2. The tubular connection assembly of claim 1, wherein the two or more segments are ring segments, the load transfer assembly further comprises a bias member disposed around the two or more ring segments to maintain relative positions of the two or more ring segments.

3. The tubular connection assembly of claim 2, further comprising an anchoring member attaching the load transfer assembly to the box end member.

4. The tubular connection assembly of claim 3, wherein the anchoring member couples the bias member to the box end member.

5. The tubular connection assembly of claim 2, wherein the bias member is a wave ring.

6. The tubular connection assembly of claim 1, further comprising two or more locking pins selectively inserted in the box end member to prevent the two or more segments from popping out of the second groove.

7. The tubular connection assembly of claim 6, further comprising a stopper attachable to the box end member to keep the two or more locking pins in position.

8. The tubular connection assembly of claim 1, wherein the box end member and the pin end member are connected by a key and a key way for transferring torsional loads.

9. The tubular connection assembly of claim 1, wherein the load transfer assembly further comprises:
 a bolt attached to each of the two or more segments, wherein the bolt extends through a wall of the box end member; and
 a nut coupled to the bolt to adjust radial position of the segments.

10. The tubular connection assembly of claim 1, wherein the load transfer assembly is movably disposed in the second groove.

11. The tubular connection assembly of claim 10, further comprising a bias element disposed in the second groove between the load transfer assembly and the pin end member.

12. A tubular connection assembly, comprising,
 a box end member having a tubular body with a central bore, wherein an inner surface of the tubular body includes two or more first grooves;
 two or more load transfer assemblies, wherein each load transfer assembly is disposed in a corresponding first groove and each load transfer assembly comprises:
  two or more segments; and
  a bias member disposed around the two or more segments;

a pin end member having a tubular body with a central bore, wherein an outer surface of the tubular body includes two or more second grooves corresponding to the two or more first grooves, and at least a portion of each segment is disposed in the corresponding second groove; and two or more locking pins selectively inserted into the box end member along an axial direction of the box end member.

13. The tubular connection assembly of claim 12, wherein the box end member is connected to a top drive, and a pin end member is connected to a tool.

14. The tubular connection assembly of claim 12, further comprising a release member selectively inserted between the box end member and the pin end member.

15. The tubular connection assembly of claim 12, wherein each locking pin is positioned radially outside a corresponding segment.

16. A method for connecting to two tubular members, comprising:

connecting a pin end member and a box end member by inserting the pin end member into the box end member until a load assembly is at least partially disposed in both a first groove formed in an inner surface of the box end member and a second groove formed in an outer surface of the pin end member; and inserting a release member between the pin end member and the box end member to disconnect the pin end member and the box end member, wherein the release member comprises a sleeve with a beveled upper end, and inserting the release member between the pin end member and box end member causes the beveled upper end of the sleeve to push the load transfer assembly out of the second groove in the pin end.

17. The method of claim 16, further comprising aligning a torque key formed on the pin end member with a key way formed in the box end member, wherein connecting the pin end member and the box end member comprises inserting the key into the key way.

18. The method of claim 16, further comprising inserting a locking pin to the box end member to prevent the load transfer assembly from popping out of the second groove.

19. The method of claim 16, further comprising attaching a stopper to secure the locking pin.

* * * * *